United States Patent [19]
Takamizawa

[11] Patent Number: 4,821,574
[45] Date of Patent: Apr. 18, 1989

[54] METHOD AND APPARATUS FOR MEASURING ULTRASONIC VELOCITY BY CROSSED BEAM

[75] Inventor: Kinya Takamizawa, Yokohama, Japan

[73] Assignee: Kabushiki Kaisha Toshiba, Kawasaki, Japan

[21] Appl. No.: 75,603

[22] Filed: Jul. 20, 1987

[30] Foreign Application Priority Data

Jul. 22, 1986 [JP] Japan ................................. 61-170831
Sep. 11, 1986 [JP] Japan ................................. 61-212670

[51] Int. Cl.$^4$ ............................................ G01N 29/04
[52] U.S. Cl. ........................................ 73/602; 73/597; 128/661.01
[58] Field of Search ................ 73/597, 602, 627, 628; 128/660

[56] References Cited

U.S. PATENT DOCUMENTS

| | | | |
|---|---|---|---|
| 3,388,372 | 6/1968 | De Witz | 340/3 |
| 4,452,081 | 6/1984 | Seppi | 73/597 |
| 4,653,505 | 3/1987 | Iinuma | 73/597 |
| 4,682,497 | 7/1987 | Sasaki | 73/602 |
| 4,700,571 | 10/1987 | Okazaki | 73/597 |
| 4,716,765 | 1/1988 | Hirama | 73/597 |

FOREIGN PATENT DOCUMENTS

| | | |
|---|---|---|
| 0119019 | 9/1984 | European Pat. Off. . |
| 0152874 | 8/1985 | European Pat. Off. . |
| 0221409 | 5/1987 | European Pat. Off. . |
| 3518526 | 1/1986 | Fed. Rep. of Germany . |
| 84/01432 | 4/1984 | World Int. Prop. O. . |

OTHER PUBLICATIONS

IEEE Transactions on Ultrasonics Ferroelectrics, and Frequency Control, vol. UFFC-33, No. 4, Jul. 1986, pp. 359–368, IEEE, New York, U.S.; J. Ophir: "Estimation of the Speed of Ultrasound Propagation in Biological Tissues: A Beam-Tracking Method", p. 359, last line—p. 363, end of section III; pp. 363–367: section V and appendix*.

Japan Society of Ultrasonic Medicine (JSUM) Proceedings, Yoichi Sumino et al, 1986, p. 677, 5/1986.

*Primary Examiner*—Stewart J. Levy
*Assistant Examiner*—Louis M. Arana
*Attorney, Agent, or Firm*—Oblon, Fisher, Spivak, McClelland & Maier

[57] ABSTRACT

A measuring apparatus for an ultrasonic velocity in a region of interest within a medium includes an array transducer, and a velocity measuring circuit. The transducer is constructed of a plurality of transducer elements which are subdivided into at least first and second transmitting sections and first and second receiving sections with having a distance. First and second ultrasonic beams are emitted from the first and second transmitting sections to the ROI under the condition that the transmitting beam axis is intersected by the receiving ultrasonic beam axis. Then, the first and second receiver sections receives in total four echoes reflected from four corners of the ROI. The velocity measuring circuit calculates the propagation time of the ultrasonic beams and finally the ultrasonic velocity based upon the propagation time.

18 Claims, 8 Drawing Sheets

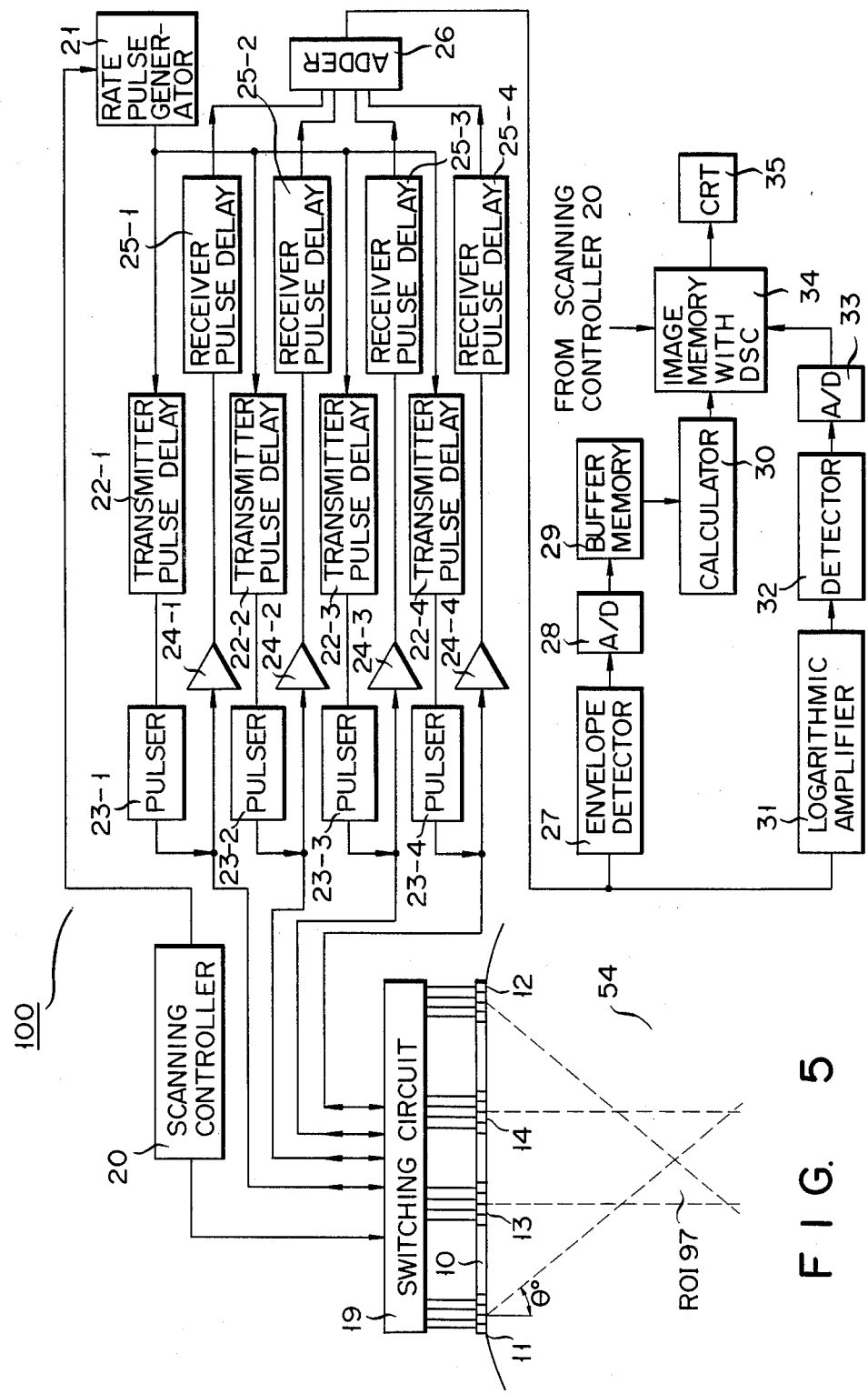
F I G. 5

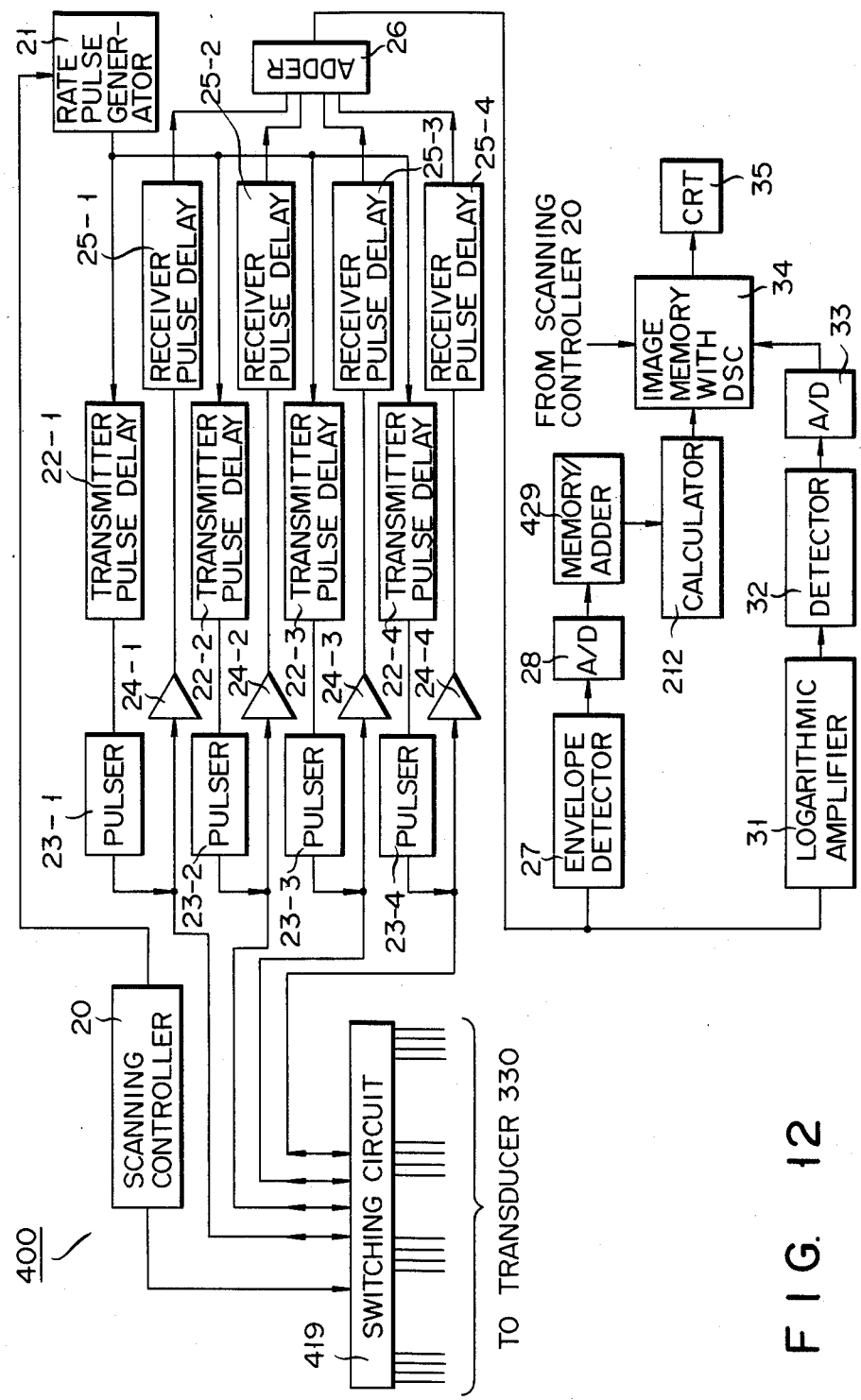
F I G. 12

METHOD AND APPARATUS FOR MEASURING ULTRASONIC VELOCITY BY CROSSED BEAM

BACKGROUND OF THE INVENTION

1. Field of the Invention

The present invention generally relates to an ultrasonic imaging apparatus for acquiring information of a medium by utilizing ultrasonic beams, and more particularly, to an apparatus for measuring the ultrasonic velocity in a local region of interest within the medium by means of crossed ultrasonic beams.

2. Description of the Related Art

Diagnostic methods using ultrasonic beams can provide a proper diagnosis of a soft tissue without harmfull effects on a biological object under examination, i.e., with noninvasive effects. In this respect, therefore, such diagnostic methods recently become popular with an improvement of high speed ultrasonic scanning apparatus. Another reason for the popularity is that diagnostic methods involve a pulse echo technique, which has a higher operability and is less limited with respect to diagnostic regions of interest (referred to as a "ROI") as compared with the transmission technique.

Recently, there is a growing demand of differential diagnostic method. This differential diagnosis is considered to be particularly effective in diagnosing the malignancy of an pathological organ or organic tissue. However, according to a conventional pulse echo technique, the intensities of echoes depend on the shape of a reflection surface, the incident angle of ultrasonic beams to the reflection surface and the amount of ultrasonic beams absorbed within a biological body, as well as a variation in the acoustic impedance (product of tissue density and ultrasonic velocity) of internal tissue structures. What is more, these intensity data are difficult to separate for detection. Naturally, the differential diagnosis for the ultrasonic diagnostic methods is considerably difficult.

On the other hand, a method of measuring only the ultrasonic velocity is executed in a transmission type ultrasonic CT (Computer Tomography). Although this method is still under development, the measuring accuracy is gradually being improved (Publication: Greenleaf, J. F. et al. Acoustical Holography Vol. 6 1975). However, since the transmission technique cannot directly apply to measure velocities in a region which includes a bone or gas in its ultrasonic propagation path, it is therefore very disadvantageous in that this technique may be applicable only to a limited field, such as a mammary-gland diagnosis.

Furthermore, very recently, the pulse echo method is modified to measure the ultrasonic velocity within an internal organ of a biological body. FIG. 1 shows an example of the method of measuring the ultrasonic velocity in a liver reported by Nishimura et al. (Proc. 44th Mtg Jpn Soc Ultrason Med 129–130 (1984). Akamatsu et al. method employs two ultrasonic transducers 151 and 152, having a strong directivity (the directions indicated by the one-dot and dash line), as a transmitter and a receiver, respectively. The transit time of the ultrasonic beams travelling from transmitting transducer 151 to receiving transducer 152, reflecting at the proximity of the intersection O of the central axes PP' and QQ' of the respective transducers 151 and 152, is measured. The average ultrasonic velocity in the liver is derived from this transit time and a predictive propagation distance (i.e., distance POS), which is calculated by the distance $\Delta X$ and incident angle $\theta$ between transducers 151 and 152.

Since the ultrasonic velocity obtained by this method is equal to the average ultrasonic velocity in the propagation path, this method is effective in diagnosis of diffused liver disease such as hepatocirrhosis which has a uniform acoustic characteristic over the entire liver. However, it cannot apply to measure the ultrasonic velocity in a local affected region. Even this diagnosis should consider the ultrasonic velocity at the epidermis or layers of fat, and muscle whose velocity is different from the velocity in liver, thus increasing an error in the measurement of the ultrasonic velocity.

For instance, when the ultrasonic velocity, $C_0$, over a living tissue is uniform in FIG. 1, the ultrasonic velocity can be accurately obtained from the equation:

$$C_0 = \frac{\Delta X}{t \sin \theta/2} \qquad (1)$$

where "t" is the measured propagation time. However, when the ultrasonic velocity of a surface layer (e.g., a layer of fat or muscle) 153 differs from the velocity in a diagnostic region 154, ultrasonic beams reflect at points "R" and "S" at which the ultrasonic beams from transmitter transducer 151 and those reaching receiver transducer 152 respectively intersect the boundary surface between diagnostic region 154 and surface layer 153. Therefore, the actual propagation distance ($\overline{RO'S}$) differs from the pre-estimated propagation distance ($\overline{ROS}$). Consequently, the ultrasonic velocity in diagnostic region 154 cannot be accurately obtained from equation (1).

According to the conventional ultrasonic velocity measuring apparatus, if the ultrasonic velocity of a surface layer structure differs from the velocity in a region of a medium ultrasonic beam refraction occurs at the boundary surface between the diagnostic region and the surface layer structure. This causes an error in the propagation distance of the beams so that the ultrasonic velocity in the region cannot be accurately estimated.

It is therefore an object of this invention to provide an ultrasonic local velocity measuring apparatus, which is hardly influenced by the surface tissue layer having the different sound velocity from the velocity in a region of interest in a medium.

SUMMARY OF THE INVENTION

The object of the present invention is accomplished by providing an apparatus for measuring an ultrasonic velocity in a region of interest within a medium by utilizing plural ultrasonic beams characterized by comprising:

transducer means including a plurality of transducer elements arranged in an array form, which are subdivided into at least first and second transmitter sections and first and second receiver sections, said sections being arranged in the order of transmitter-receiver-receiver-transmitter sections, and being located at predetermined distances, and each of said first and second transmitter and receiver sections being constructed of a plurality of transducer elements;

driver means for driving said first and second transmitter sections to transmit first and second ultrasonic beams respectively to said ROI, said first ultrasonic transmit beam being intersected by said second ultrasonic transmit beam within said ROI;

receiver means coupled to said first and second receiver sections, for receiving ultrasonic echoes reflected from said ROI to produce echo signals; and, processor means for processing said echo signals to calculate propagation time of said ultrasonic beams and said ultrasonic velocity within said ROI based upon said calculated propagation time and said distance between said first and second receiver sections.

BRIEF DESCRIPTION OF THE DRAWINGS

For the above object and features of the present invention, reference is made to the following detailed description of the invention to be read in conjunction with the following drawings, in which:

FIG. 5 is a schematic block diagram of an ultrasonic velocity measuring apparatus utilizing the first basic idea according to the invention;

FIG. 12 is a schematic block diagram of an ultrasonic velocity measuring apparatus capable of displaying, operated under the second basic idea according to the invention.

DETAILED DESCRIPTION OF THE PREFERRED EMBODIMENTS

First Basic Idea for Measuring Ultrasonic Velocity in a Local Region Within a Body Before proceeding with various types of preferred embodiments according to this invention, the first basic idea will now be summarized, which has been utilized in an ultrasonic velocity measurement method according to the present invention.

Figure 1:
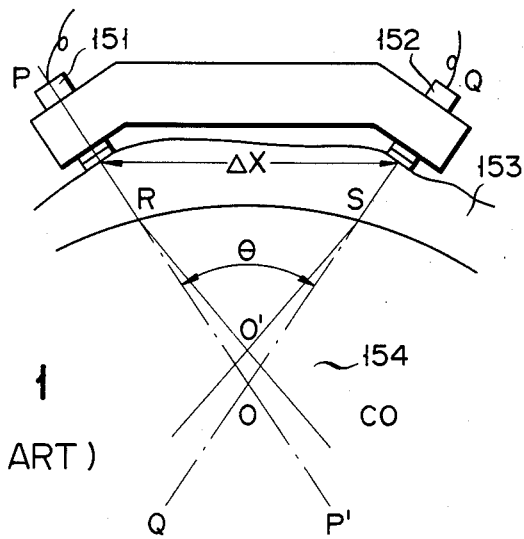
FIG. 1 is an illustration for demonstrating the conventional ultrasonic velocity measuring method.
Figure 2:
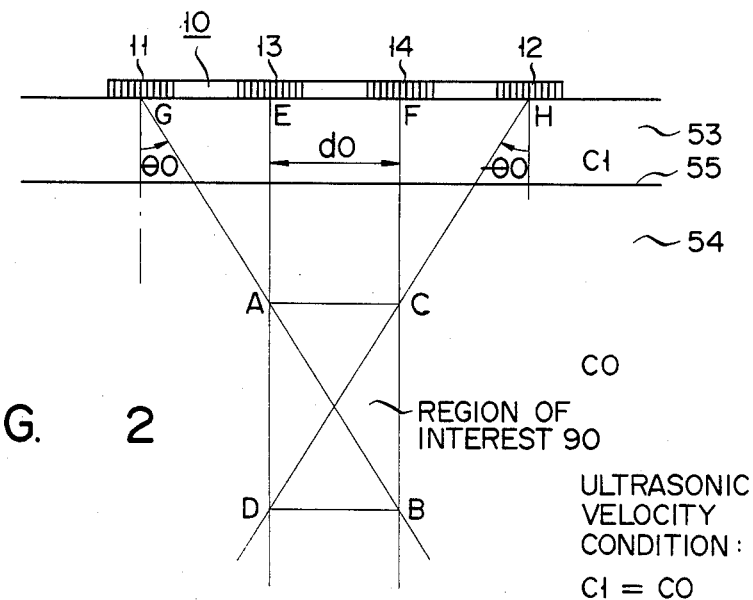
FIG. 2 to 4 are illustrations for demonstrating a first basic idea to measure ultrasonic velocity in a region of interest.

FIG. 2 shows an array ultrasonic transducer 10 arranged in order to measure the ultrasonic velocity in a living body according to the first principle of the measurement. As illustrated, the array type ultrasonic transducer 10 having a plurality of transducer elements is arranged on the surface of a living body 54, and its transducer elements are allocated as transmitter transducer sections 11 and 12 and receiver transducer sections 13 and 14. Transmitter transducer sections 11 and 12 are located to sandwich, in other words outside receiver transducer sections 13 and 14 along the longitudinal direction. The radiation angle $\theta_0$ of transmitted beams is electronically controlled as will be described later. Transmitting transducer sections 11 and 12 have a strong directivity in the directions of the angles $\theta_0$ and $-\theta_0$, while receiving transducer sections 13 and 14 have a strong directivity in the front direction ($\theta=0°$), i.e., the vertical direction in FIG. 2. As a result, only those of the ultrasonic beams from transmitting transducer section 11 which are scattered at point "A" in living body 54 are received only by receiving transducer section 13 and converted there into electric signals, while only those ultrasonic beams from transmitting transducer section 11 which are scattered at point "B" are received only by receiving transducer section 14 to be converted into electronic echo signals. Similarly, the ultrasonic beams from transmitting transducer section 12 are scattered at points "C" and "D" and are then received by receiving sections 14 and 13, respectively. The tranmit times, $t_{11}$ and $t_{12}$, of the ultrasonic beams travelling from transmitting transducer section 11 to receiving transducer sections 13 and 14, after scattered by a scattering article respectively at points "A" and "B", are expressed by:

$$t_{11} = t_{GA} + t_{EA} \\ t_{12} = t_{GA} + t_{FC} + (\overline{AB} + \overline{BC})/C_0 \quad (2)$$

Similarly, the transit times, $t_{21}$ and $t_{22}$, of the ultrasonic beams travelling from transmitting transducer section 12 to receiving transducer sections 13 and 14, after scattered respectively at points "D" and "C", are expressed by:

$$t_{21} = t_{HC} + t_{EA} + (\overline{AD} + \overline{CD})/C_0 \\ t_{22} = t_{HC} + t_{FC} \quad (3)$$

In equations (2) and (3), $t_{GA}$, $t_{EA}$, $t_{FC}$ and $t_{HC}$ are transit times at distances GA, EA, FC, and HC, respectively, and "$C_0$" is the ultrasonic velocity in a region of interest 90 (region ACBD).

First, assuming that a surface tissue 53 does not exist, the ultrasonic velocity in the region of interest (referred to a "ROI") is obtained with the incident angle of the transmitted beams denoted as $\theta_0$ and $\overline{EF}=d_0$. Then, the propagation time difference "$\Delta t$" is defined as follows:

$$\Delta t = t_{12} - t_{11} + t_{21} - t_{22} = (\overline{AB} + \overline{BC} + \overline{AD} + \overline{CD})/C_0 \quad (4)$$

$$= \frac{2d_0}{C_0}\left(\frac{1+\cos\theta_0}{\sin\theta_0}\right)$$

Therefore, the ultrasonic velocity $C_0$ in region of interest 90 can be calculated from the following equation (5) which is equation (4) rewritten:

$$C_0 = \frac{2d_0}{\Delta t}\left(\frac{1+\cos\theta_0}{\sin\theta_0}\right) \quad (5)$$

Figure 3:
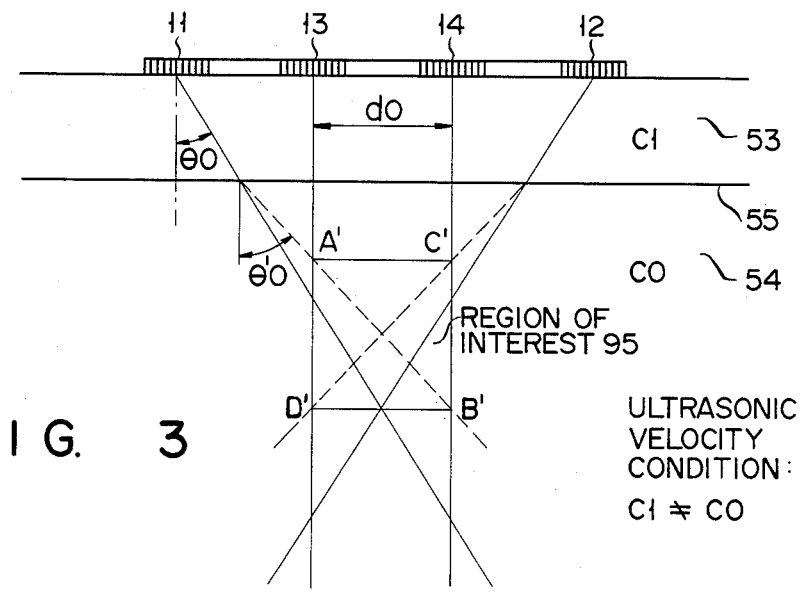

Let us now consider the case where the ultrasonic velocity $C_1$ in surface tissue 53 differs from $C_0$, referring to FIG. 3. For instance, when $C_1 < C_0$ as is in the case where surface tissue 53 is a layer of fat, the transmitted beams are refracted at a boundary surface 55 between the fat layer and the region of interest, as shown in the broken lines in FIG. 3.

Assume that boundary surface 55 lies parallel to the surface of array transducer 10, "$\theta_0$" denotes the radiation angle of the ultrasonic beams transmitted from each transmitting transducer section, and that $\theta'_0$ denotes the refraction angle of these ultrasonic beams at boundary surface 55. Then, the ultrasonic velocity $C_0$ in region of interest 95 (region A'C'B'D') can be obtained from the following equation:

$$C_0 = \frac{2d_0}{\Delta t'} \left( \frac{1 + \cos \theta'_0}{\sin \theta'_0} \right) \quad (6)$$

where $\Delta t'$ is the propagation time difference that can be obtained from the measured propagation time of the ultrasonic beams as per equation (4). Since $\theta'_0$ in equation (6) is unknown, equation (6) cannot be directly used. However, it is known by the Snell's law that the following relationship always exists:

$$\frac{\sin \theta_0}{C_1} = \frac{\sin \theta'_0}{C_0} = \alpha \quad (7)$$

Using equation (7) and thus cancelling the unknown term $\theta'_0$ in equation (6) yields the following equation (8) from which $C_0$ can be obtained.

$$C_0 = \frac{2d_0}{\Delta t'} \left( \frac{\Delta t'}{d_0 \alpha} - 1 \right)^{\frac{1}{2}} \quad (8)$$

The term "$\alpha$" in equation (7) can easily be set for the electronic beam deflection or steering caused by using array type transducer 10.

ELECTRONIC STEERING

Figure 4:
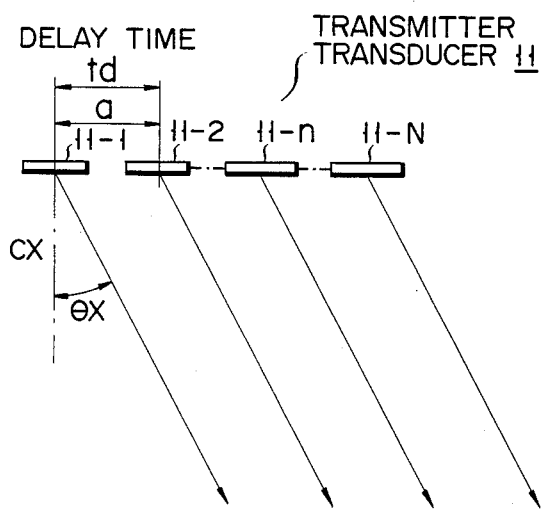

Referring now to FIG. 4, the principle of the above-described electronic steering method of ultrasonic beams will be described in more detail.

Assume now that transmitting transducer section 11 of FIG. 3 comprises N pieces of transducer elements spaced with the intervals "a" and that the ultrasonic beams are transmitted from the transducer elements in the direction of $\theta_X$. This radiation angle $\theta_X$ can be expressed in the following equation when one transducer element is driven with a delayed time "td" with respect to the preceding transducer element (e.g., a delay time of $(n-1)td$ is given to the $(11-n)$-th transducer element with respect to the $(11-1)$-th transducer element.

$$\frac{a \sin \theta_X}{C_X} = td \quad (9)$$

where $C_X$ is the ultrasonic velocity in a medium adjacent to transducer elements $11-1$ to $11-n$. In this case, therefore, $\theta_X$ cannot be independently obtained but would always be obtained as the ratio with respect to the ultrasonic velocity $C_X$. From equations (7) and (9), $\alpha$ is expressed as follows $$\alpha = \frac{\sin \theta_X}{C_X} = \frac{td}{a} \quad (10)$$

and is a known value that is determined by the measuring system.

Therefore, using equation (8) from which the ultrasonic velocity $C_0$ in region of interest 95 of FIG. 3 is obtained, it is possible to accurately estimate the ultrasonic velocity in region 95 even when, for example, surface tissue 53 lies above region 95. This is the first basic idea of this invention, based on which the following embodiments are realized.

The above description has been given with the case where surface tissue 53 lies parallel with array transducer 10 in FIG. 3. However, the measurement error due to the beam refraction can be considerably reduced even when surface tissue 53 does not lie parallel with array transducer 10, as long as the shape of surface tissue 53 is not significantly complicated.

As should be understood from the above description, the basic principle of the ultrasonic velocity measurement of this invention utilizes the so-called "crossed beam method".

Ultrasonic Velocity Measuring Arrangement Operated Under First Measuring Idea In FIG. 5, there is provided an ultrasonic velocity measuring apparatus 100 according to a first preferred embodiment of the invention, which is operable on the basis of the above-defined first velocity-measurement principle.

A linear array transducer 10 is arranged adjacent to living body 54. Of the transducer elements of array type transducer 10, those constituting first transmitting transducer section 11 or second transmitter transducer section 12 (four transducer elements constituting each transmitter transducer section in FIG. 5) are used in a transmitting mode to radiate ultrasonic beams into living body 54 in the direction indicated by the broken lines in FIG. 5. More specifically, only transmitting transducer sections 11 and 12 of array transducer 10 are selected by a switching circuit 19, which is controlled by a scanning controller 20, and are supplied with driving pulses from a pulser 23. When the driving pulses are supplied to transmitting transducer sections 11 and 12 so that the ultrasonic beams are radiated into living body 54, array transducer 10 is set to a reception mode. As a result, first receiver transducer section 13 or second receiver transducer section 14 is selected by switching circuit 19. so as to receive the ultrasonic beams.

The transmitting/receiving circuit section of FIG. 5 has the same configuration as that of the conventional electronic scanning ultrasonic apparatus. In the transmitting mode, a repetitive pulse signal with a cycle of approximately 200 $\mu$sec, which is generated in a rate pulse generator 21, is delayed in a transmitting pulse delay circuit 22 by a predetermined time, and then supplied to pulser 23 where the transmitting drive pulses are generated. In the reception mode, scattering signals which have been converted into electronic echo signals in first or second receiver transducer section 13 or 14 are transferred through switching circuit 19 to a preamplifier 24 and are amplified. The amplified signals are delayed by a receiver pulse delay circuit 25 and are then added in an adder 26. In this case, transmitter pulse delay circuit 22 provides the transmitting drive pulses with delay time for deflecting the transmitted beams by the angle of $\theta°$ and a delay time for focusing the beams at the same time, while receiver delay circuit 25 provides delay time for focusing the receiving signal. The receiving signals from receiver delay circuit 25 are added in adder 26. The resultant added signal is supplied through a logarithmic amplifier 31 and a detector 32 to an A/D converter where the echo signal is converted into a digital signal in order to provide a conventional ultrasonic image (B-mode image). The digital signal is then stored into an image memory (not shown in detail) of a digital scan converter (DSC) 34.

In order to measure the ultrasonic velocity according to the feature of the preferred embodiment, the output signal of adder 26 is subjected to an envelope detection and an A/D conversion after going through a sensitive time control (STC) circuit, and is then stored into a buffer memory 29. Based on the signal stored in buffer memory 29, a calculator 30 calculates the propagation time of the ultrasonic beams and estimates the ultrasonic velocity in living body 54. In other words, calculator 30 estimates the ultrasonic velocity in region of interest 97 (FIG. 5) in living body 54, using the aforementioned equations.

Calculation on Propagation Time

Figure 6:
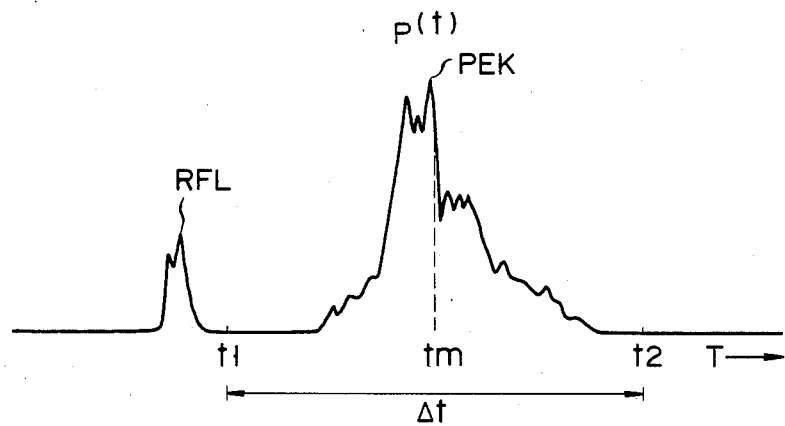
FIG. 6 shows a waveform of a received signal after processed in an envelope detector shown in FIG. 5.

The following will describe how to calculate the propagation time. FIG. 6 illustrates the waveform of the receiver pulse after envelope detection, which is acquired, for example, when first transmitter transducer section 11 and first receiver transducer section 13 are used. That is, FIG. 6 shows the waveform of the output signal of an envelope detector 27. It is known to measure the front edge or the peak position of a waveform in order to measure the propagation time of the received echo signals. When scattering articles are densely present as in living body 54, however, interference occurs between the ultrasonic beams so that the waveform of the signal after envelope detection would become significantly complicated, as illustrated in FIG. 6. Consequently, it is difficult to accurately measure the propagation time from the peak position of the envelope-detected signal waveform. What is more, according to the pulse echoing technique, it is not practically possible to determine the front edge of a signal waveform. It is therefore considered desirable to use a gravitational center measurement or so-called first order moment measurement. However, when a reflecting article (e.g., a blood vessel in a liver) which has a strong reflection intensity exists near the region where the transmitted and returning ultrasonic beams intersect with each other, i.e., the crossed beam, the output signal from envelope detector 27 is likely to contain the signal coming from the reflecting article, as indicated by "RFL" in FIG. 6. In this case, therefore, it is necessary to restrict a time interval $\Delta t$ for calculating the gravitational center. For instance, the peak position tm (see PEK in FIG. 6) of a received signal is first obtained and the calculation of the gravitational center is then executed within a predetermined time width $\Delta t$ with tm as its center. That is, the propagation time $t_{11}$ can be obtained from equation (11) below:

$$t_{11} = \frac{\int_{t_1}^{t_2} t P_{11}(t) dt}{\int_{t_1}^{t_2} P_{11}(t) dt} \quad (11)$$

where $P_{11}(t)$ represents the waveform (FIG. 6) of the receiving signal after envelope detection, and $t_1$ and $t_2$ are defined as follows.

$$t_1 = t_m - \frac{\Delta t}{2} \text{ and } t_2 = t_m + \frac{\Delta t}{2}.$$

Using the propagation time (t11) acquired by equation (11), calculator 30 calculates the ultrasonic velocity in region of interest 97 from equation (8). In other words, calculator 30 calculates the propagation time of the ultrasonic beams and the ultrasonic velocity in this region.

The present embodiment ensures the measurement of the ultrasonic velocity in a biological body using an ultrasonic array transducer 10, thus improving the scanning reliability. This embodiment can also display real-time B-mode images. Therefore, it is easy to precisely set region of interest 97, whose ultrasonic velocity is to be measured, on a displayed image on a CRT (Cathode Ray Tube) 35. In addition, this embodiment allows both the positions of transmitter and receiver transducer sections and the transmitting beam angle to be easily changed by electronic means. This enables the position of the region of interest to be varied at a high speed, and thus realize the two-dimensional mapping of the ultrasonic velocity in a biological body in a real time.

Second Basic Idea for Measuring Ultrasonic Velocity in a Local Region Within a Body The following explains the second ultrasonic velocity measurement principle, when an article interrupts the beam propagation in an ultrasonic propagation path between the transmitting and receiving transducer sections, and in the region of interest within the body.

Figure 7:
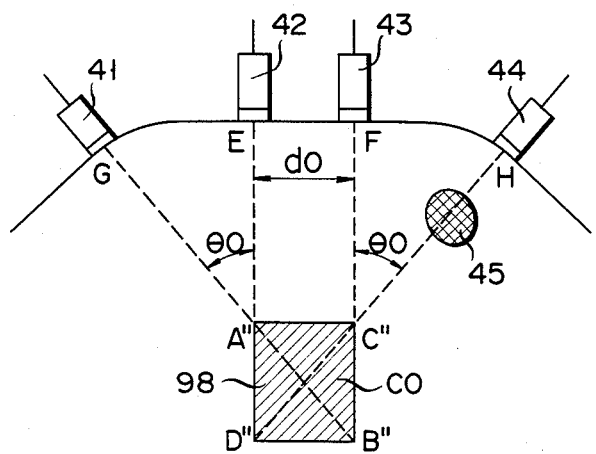
FIG. 7 to 8B are illustrations for demonstrating a second basic idea to measure an ultrasonic velocity in a region of interest.

The ultrasonic velocity measurement method using crossed beams will now be explained, referring to FIGS. 7 and 8 relating to FIGS. 2 and 3, which have been used to explain the first basic idea of this invention. FIG. 7 illustrates the principle of the second basic idea. Transmitting transducers 41 and 44 (corresponding to transmitting transducer sections 11 and 12 of FIG. 2) and receiving transducers 42 and 43 (corresponding to receiving transducer sections 13 and 14 of FIG. 2) are arranged on the surface of the living body, as illustrated. The ultrasonic velocity $C_0$ in a region of interest 98 (A"B"C"D") surrounded by the transmitting and returning ultrasonic beams, i.e., is estimated. The transit times $t_{11}$ and $t_{12}$ of the ultrasonic beams travelling from transmitting transducer 41 to receiving transducers 42 and 43, after scattered in the region (ROI) 98 at points A" and B", are also expressed by the aforementioned equation (2) again presented below:

$$t_{11} = t_{GA"} + t_{EA"} \quad (2)$$

$$t_{12} = t_{GA"} + t_{FC"} + (\overline{A"B"} + \overline{B"C"})/C_0$$

Similarly, the transit times, $t_{21}$ and $t_{22}$, of the ultrasonic beams travelling from transmitter transducer 44 to receiver transducers 42 and 43, after scattered respectively at points D" and C", are expressed by the aforementioned equation (3) again presented below:

$$t_{21} = t_{HC"} + t_{EA"} + (\overline{A"D"} + \overline{C"D"})/C_0 \quad (3)$$

$$t_{22} = t_{HC"} + t_{FC"}$$

In this case, however, $t_{GA"}$, $t_{EA"}$, $t_{FC"}$ and $t_{HC"}$ are propagation times along distances $\overline{GA"}$, $\overline{EA"}$, $\overline{FC"}$ and $\overline{HC"}$, respectively. Provided that the incident angle of transmitted ultrasonic beams is $\theta_0$, and the distance between these receiver transducers 42 and 43 $\overline{EF} = d_0$, the propagation time $\Delta t$ is given as follows:

$$\Delta t = t_{12} - t_{11} + t_{21} - t_{22} \quad (22)$$
$$= (\overline{A''B''} + \overline{B''C''} + \overline{A''D''} + \overline{C''D''})/C_0$$
$$= 2d_0 \cot\left(\frac{\theta_0}{2}\right)/C_0$$

Rewriting this equation, therefore, yields the following equation (13) for obtaining the ultrasonic velocity $C_0$ in region of interest 98 once the propagation time $\Delta t$ is attained.

$$C_0 = \frac{2d_0}{\Delta t} \cot\left(\frac{\theta_0}{2}\right) \quad (13)$$

In the local ultrasonic velocity measurement shown in FIG. 7, when an article interrupts the passage of ultrasonic beams between the region of interest 98 and transmitter and receiver transducers 41-44, all of the aforementioned four propagation times can not be measured. Therefore, by a local velocity measuring method as is previously described, the local velocity cannot be accurately obtained.

This problem will now be further explained in detail, referring to a practical example.

Figure 8A:
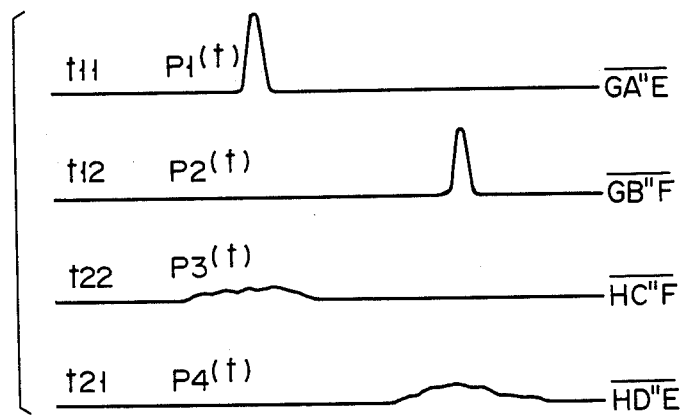

For instance, when an article 45 having a very high propagation attenuation or a boundary that causes a full reflection of ultrasonic beams exists in the beam propagation path between transmitter transducer 44 and region of interest 98 ($\overline{A''C''B''D''}$), as shown in FIG. 7, there are four types of received signals, $P_1(t)$, $P_2(t)$, $P_3(t)$ and $P_4(t)$, acquired from two receiver transducers 42 and 43 (see FIG. 8A). $P_1(t)$ through $P_4(t)$ are the waveforms of the signals, travelling the distances $\overline{GA''E}$, $\overline{GB''F}$, $\overline{HC''F}$ and $\overline{HD''E}$, respectively. From the gravitational centers of these waveforms, the propagation times $t_{11}$, $t_{12}$, $t_{21}$ and $t_{22}$ for this case are obtained as follows:

$$t_{11} = \frac{\int tP_1(t)dt}{\int P_1(t)dt}, \quad t_{12} = \frac{\int tP_2(t)dt}{\int P_2(t)dt}, \quad (14)$$
$$t_{22} = \frac{\int tP_3(t)dt}{\int P_3(t)dt}, \quad t_{21} = \frac{\int tP_4(t)dt}{\int P_4(t)dt}$$

However, it is difficult to receive the beams returned from points C'' and D'' of region of interest 98 due to the presence of obstacle 45. Consequently, the propagation times $t_{22}$ and $t_{21}$ cannot be precisely obtained. According to the previous method, therefore, it is practically impossible to estimate the ultrasonic velocity in such a local region 98.

In contrast, according to the second ultrasonic velocity measurement principle, all of the four waveforms of the received signals, namely $P_1(t)$ to $P_4(t)$, are added before the propagation times are calculated. The propagation times are then calculated from the gravitational center of the resultant, synthesized waveform. In this manner, the aforementioned problem can be solved.

Figure 8B:
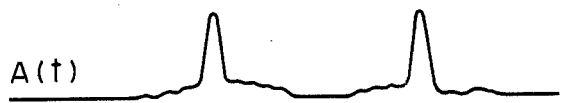

The synthesized waveform according to the second principle of this invention is as shown in FIG. 8B and is expressed by the following equation (15).

$$A(t) = P_1(t) + P_2(t) + P_3(t) + P_4(t) \quad (15)$$

Here, $P_1(t)+P_3(t)$ and $P_2(t)+P_4(t)$ can be independently calculated because their reception times are separated from each other. The gravitational centers, "ta" and "tb", of these two added waveforms are expressed as follows:

$$ta = \frac{\int t\{P_1(t) + P_3(t)\}dt}{\int \{P_1(t) + P_3(t)\}dt}, \quad (16)$$
$$tb = \frac{\int t\{P_2(t) + P_4(t)\}dt}{\int \{P_2(t) + P_4(t)\}dt},$$

No Scattering Article

When there is no scattering article 45, $\int P_1(t)dt \approx \int P_3(t)dt = I_0$ is generally satisfied. Thus, we obtain $$ta = \frac{\int tP_1(t)dt + \int tP_3(t)dt}{2I_0} + \frac{1}{2}(t_{11} + t_{33}) \quad (17)$$

$$tb = \frac{1}{2}(t_{12} + t_{21})$$

and $$\Delta t = t_{12} - t_{11} + t_{21} - t_{22} = 2(tb - ta) \quad (18)$$

Substituting equation (18) into equation (13) yields the desired ultrasonic velocity $C_0$.

Existence of Scattering Article

When there exists scattering article 45, given $P_3(t) \approx 0$ and $P_4(t) \approx 0$, we obtain $$ta = t_{11}, \, tb = t_{12} \quad (19)$$

$$\Delta t = 2(tb - ta) = 2(t_{12} - t_{11})$$

When the propagation times along distances $\overline{A''E}$ and $\overline{C''F}$ are nearly equal to each other, the local ultrasonic velocity in region of interest 98 can be accurately obtained.

On the other hand, when these propagation times are not equal to each other, unlike the previous method, the second measurement principle makes it possible to calculate the local velocity even with a permissible error in estimation of the velocity.

Summary of Second Velocity Measuring Idea

The above-described second ultrasonic velocity measurement principle of this invention will now be summarized.

After four different reflecting signals attained by the system using two transmitting transducers and two receiving transducers are added, the peak positions or gravitational centers of the waveform of the resultant signal are calculated. The feature of the second measurement principle lies in that when an article, which blocks the ultrasonic beam propagation, exists between the transmitter/receiver transducers and the region of interest, a possibility of a large calculation error is prevented by automatically eliminating the propagation time of ultrasonic beams passing through this article. Although the above explanation has been given with the case where such a scattering article exists between the transmitter receiver and the region of interest, the same effects can be expected in the case where the scattering article exists between the receiver transducer and the region of interest.

Ultrasonic Velocity Measuring Arrangement Operated Under Second Measuring Idea An ultrasonic velocity measuring apparatus 200 according to a first preferred embodiment of this invention, which is operable on the basis of the above-defined second velocity measurement principle, will now be explained with reference to FIG. 9.

Figure 9:
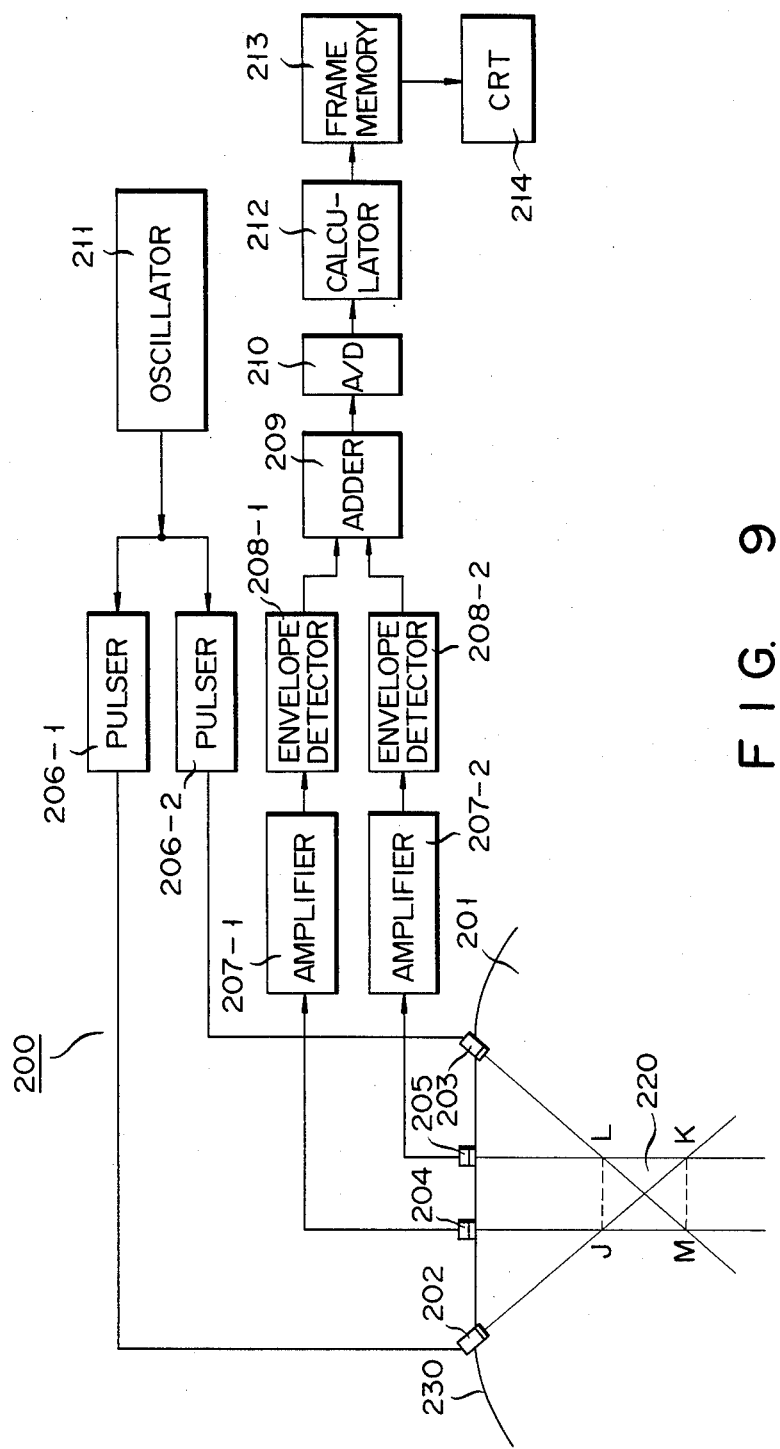
FIG. 9 is a schematic diagram of an ultrasonic velocity measuring apparatus utilizing the second basic idea according to the invention.

FIG. 9 illustrates the arrangement of ultrasonic velocity measuring apparatus 200, which ensures the measurement of a local ultrasonic velocity in a living body 201. Transmitting transducers 202 and 203 and receiving transducers 204 and 205 are arranged, as illustrated in FIG. 9. Transmitter transducers 202 and 203 are driven by the driving pulses from pulsers 206-1 and 206-2, respectively, so as to radiate ultrasonic beams into living body 201. The transmitted beams are scattered by a tissue in living body 201. The ultrasonic beams scattered at points J and M of a region of interest 220 are received by receiver transducer 204, while those scattered at points K and L of region of interest 220 are received by receiver transducer 205.

The receiving signals received by receiver transducers 204 and 205 are respectively amplified by amplifiers 207-1 and 207-2 and are subjected to envelope detection in the respective envelope detectors 208-1 and 208-2. The resultant signals are then added in an adder 209. The added signal is converted into a digital signal in an A/D converter 210 and is then supplied to a calculator 212 where the propagation times is calculated based on the aforementioned second velocity measurement principle. Here, the propagation times are calculated from the added waveform of the signal scattered at points J and L and from the added waveform of those scattered at points K and M, and the local ultrasonic velocity in region of interest 220 within living body 201 is attained using equations (13) and (18).

Transmitter/receiver transducers 202-205 can be moved and the radiation angle of the transmitting beams can be varied mechanically or electrically, thereby the location of a region of interest can be selected. Therefore, it is possible to obtain the two-dimensional ultrasonic velocity distribution and display the mapping onto a CRT 214 through a frame memory 213.

Second Measuring Arrangement Operated Under Second Measuring Idea

An ultrasonic velocity measuring apparatus 300 according to a second preferred embodiment of this invention, which is operable on the basis of the above-defined second velocity measurement principle, will now be explained with reference to FIG. 10.

Figure 10:
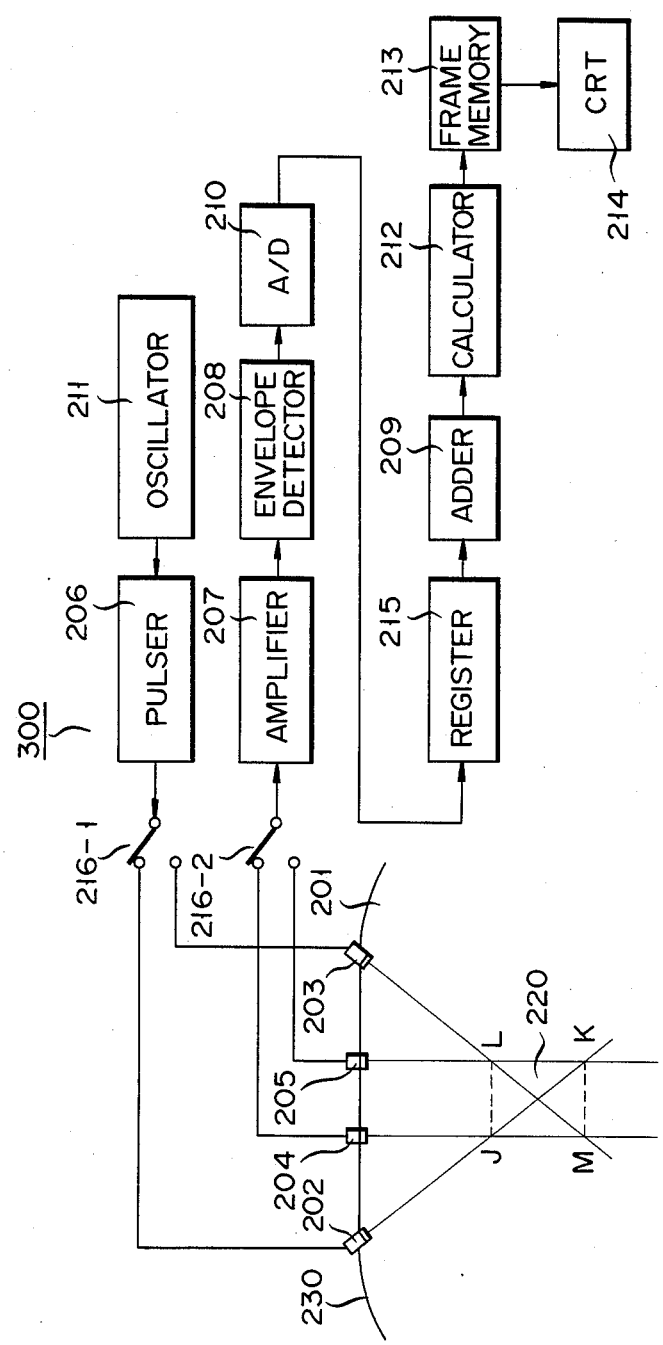
FIG. 10 is a schematic diagram of another ultrasonic velocity measuring apparatus utilizing the second basic idea.

For simplicity of illustration, the same reference numerals as are used in FIG. 9 are also used to denote the corresponding elements in FIG. 10.

Either transmitting transducer 202 or 203 is selected by a switching circuit 216-1, and either receiving transducer 204 or 205 is selected by another switching circuit 261-2. Therefore, the waveforms $P_1(t)$ to $P_4(t)$ expressed by equation (15) are obtained by two transmitting operations and two receiving operations. These waveforms are converted into digital signals by A/D converter 210, and the digital signals are supplied to a register 215 for temporary storage and then added by adder 209. This measuring method requires a longer time but a simpler electronic circuit to measure the propagation times, as compared with the method illustrated in FIG. 9.

Figure 11:
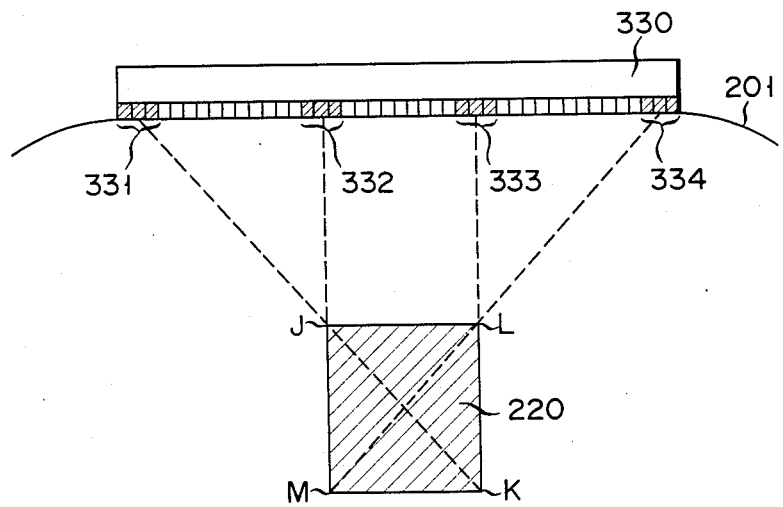
FIG. 11 schematically shows an ultrasonic transducer operable in electronic steering.

Third Measuring Arrangement Capable of Displaying Tomographic Image and Operated Under Second Measuring Idea FIG. 11 illustrates an array transducer 330, which is used when a tomographic image of living body 201 is acquired by means of electronic scanning. FIG. 12 illustrates an application example in which the transducer of FIG. 11 is utilized in ultrasonic velocity measuring apparatus 300, which is operated on the basis of the aforementioned second velocity measurement principle.

In FIG. 11, of plural transducer elements of array transducer 330, those included in shaded regions 331 and 334 are used for beam transmission, while those included in shaded regions 332 and 333 are used for beam reception.

When ultrasonic beams are transmitted from transmitter region 331, the ultrasonic beams can be electronically deflected, for example, as shown in FIG. 7, by delaying the driving timings of plural transducer elements adjacent to transmitter region 331 by a predetermined time delay means to be described later. The same can apply to the other transmitter region 334. The method disclosed in U.S. Pat. No. 4,075,598 may be a practical example of providing such an electronic beam deflection.

Referring also to FIG. 12, the following explains ultrasonic velocity measuring apparatus 400, which utilizes transducer 330 of FIG. 11 to execute the electronic beam steering and is capable of displaying tomographic images.

As the circuit arrangement of FIG. 12 is similar to that shown in FIG. 5, the reference numerals used in FIG. 5 are also used for the corresponding or similar elements in FIG. 12.

In FIG. 12, the beams transmitted and deflected by transducer 330 are reflected in living body 201 and received by transducer 330. The received signals are subjected to a predetermined focusing operation in receiving pulse delay circuits 25-1 to 25-4 and are then added by first adder 26. The added signal is subjected to envelope detection and an A/D conversion, and is stored in a memory/adder 429. After going through a further addition, the stored signal is supplied to calculator 212 which performs a predetermined calculation to provide the propagation times and the ultrasonic velocity in region of interest 220.

The added signal from adder 26 is also subjected to a logarithmic amplification, an envelope detection, and then to an A/D conversion. The converted data is stored into an image memory of digital scan converter (DSC) 34, which provides tomographic image data. Through the above operations, the tomographic image of living body 201 and the ultrasonic velocity in region of interest 220 can be displayed on CRT 35.

The ultrasonic velocity measuring apparatus 400 operable on the basis of the aforementioned second velocity measurement principle of this invention has the following features.

It is possible to measure the ultrasonic velocity in a biological body using a single array ultrasonic transducer, thus improving the scanning reliability. It is also possible to provide a real-time display of a B-mode image. Therefore, it is easy to precisely adjust a region of interest, whose ultrasonic velocity is to be measured, on a CRT. Moreover, the positions of transmitter/receiver transducers (transmitter and receiver regions 331-334) and the beam radiation angle can be changed easily and at a high speed by the use of electronic means. This enables the intersection region by the beam transmission region and beam reception region to be changed with the crossed beams, and thus ensures the measurement of the local ultrasonic velocity over all the living body. In addition, the two-dimensional distribution of the ultrasonic velocity can be displayed. That is, it is possible to provide the ultrasonic velocity distribution in the living body using the pulse echoing technique, which is impossible according to the conventional method.

The present invention is not limited to the arrangement of the transmitter/receiver transducers shown in FIG. 7, or to the number of transducers in use as long as the transmitter transducers and receiver transducers are each two or more in number.

This invention can ensure the attainment of the local ultrasonic velocity in a living body even when an article that prevents the beam propagation exists in the living body, and can provide an effective means to display the two-dimensional distribution of the ultrasonic velocity.

What is claimed is:

1. An apparatus for measuring an ultrasonic velocity in a region of interest (ROI) within a medium by utilizing plural ultrasonic beams, comprising:

transducer means including a plurality of transducer elements arranged in an array form, which are subdivided into at least first and second transmitter sections and first and second receiver sections, said first and second receiver sections being located, at predetermined intervals, between said first and second transmitter sections along a longitudinal direction of the array of said transducer elements;

driving means for driving said first and second transmitter sections to transmit first and second ultrasonic beams to said ROI;

receiving means coupled to said first and second receiver sections, for receiving echo signals, which are produced from said first and second receiver sections and correspond to ultrasonic echoes of the first and second ultrasonic beams which are reflected from said ROI; and, processor means for processing said echo signals to calculate times of propagation of said ultrasonic beams in said ROI, said processor means calculating an ultrasonic velocity within said ROI based upon said calculated propagation times.

2. An apparatus as claimed in claim 1, wherein said processor means calculates the following equation to obtain said ultrasonic velocity within said ROI:

$$C_0 = \frac{2d_0}{\Delta t'} \left( \frac{\Delta t'}{d_0 \cdot \alpha} - 1 \right)^{\frac{1}{2}}$$

where "$d_0$" is a distance between the first and second receiving sections, "$\Delta t'$" denotes a propagation time difference between said first and second ultrasonic beams transmitted from said first and second transmitter sections and received by said first and second receiver sections, and "$\alpha$" is defined by a ratio of a delay time to a predetermined distance between the adjacent two of the transducer elements, said delay time being given to each of the transducer elements with respect to the adjacent one of the transducer elements.

3. An apparatus as claimed in claim 1, wherein said processor means includes:

an adder for adding said echo signals to produce a single synthesized echo signal;

a detector for envelope-detecting said synthesized echo signal to derive an envelope-detected receiving signal; and a calculated for calculating said envelope-detected receiving signal to finally obtain said ultrasonic velocity within said ROI.

4. An apparatus as claimed in claim 3, wherein said calculator calculates said propagation time from said envelope-detected receiving signal based upon a method of measuring a center of gravity of said envelope-detected echo signal.

5. An apparatus as claimed in claim 1, further comprising:

a logarithmic amplifier for logarithmic-amplifying said echo signals derived from said receiver means; and a detector for detecting said logarithmic-amplified echo signals to produce an ultrasonic tomographic image signal of said medium.

6. An apparatus for measuring an ultrasonic velocity in a region of interest (ROI) within a medium by utilizing plural ultrasonic beams, comprising:

transducer means including a plurality of transducer elements arranged in an array which are subdivided into at least first and second transmitter sections and first and second receiver sections, said first and second receiver sections being located, at predetermined intervals, between said first and second transmitter sections along a longitudinal direction of the array of said transducer elements;

driver means for driving said first and second transmitter sections to transmit first and second ultrasonic beams toward said ROI, so that said first ultrasonic beam is intersected by said second ultrasonic beam within said ROI;

said first and second receiver sections receiving four-point echoes of the first and second ultrasonic beams which are reflected from four points defined within the ROI and corresponding to four corners of a rectangular form, and producing four echo signals corresponding to the four-point echoes;

adder means for adding said four echo signals to produce a single synthesized echo signal; and calculator means for calculating from said synthesized echo signal, propagation times of said ultrasonic beams, said calculator means calculating an ultrasonic velocity within said ROI based upon said calculated propagation times and said distance between said first and second receiver sections.

7. An apparatus for measuring an ultrasonic velocity in a region of interest (ROI) within a medium by utilizing plural ultrasonic beams, comprising:

transducer means including a plurality of transducer elements arranged in an array form, which are subdivided into at least first and second transmitting sections and first and second receiving sections, said sections being arranged in the order of transmitter-receiver-receiver-transmitter sections, and being located at predetermined distances, and each of said first and second transmitter and receiver sections being constructed of a plurality of transducer elements;

driver means for driving said first and second transmitter sections to transmit first and second ultrasonic beams respectively toward said ROI, said first beam being intersected by said second ultrasonic beam within said ROI;

first switching means for selectively coupling said driving means to said first and second transmitter sections so as to selectively excite said transmitter sections;

detector means for detecting ultrasonic echoes reflected from four points, which correspond to four corners of a rectangular region defined in said ROI, to produce four detected echo signals;

second switching means for selectively coupling said detector means to said first and second receiver sections to receive said ultrasonic echoes;

adder means for adding said detected echo signals to produce a single synthesized echo signal; and calculator means for calculating from said synthesized echo signal, propagation times of said ultrasonic beams and an ultrasonic velocity within said ROI based upon said calculated propagation times and said distance between said first and second receiver sections.

8. An apparatus as claimed in claim 7, wherein said calculator means calculates the following equation to obtain said velocity within said ROI;

$$C_0 = \frac{2d_0}{\Delta t} \cot\left(\frac{\theta_0}{2}\right)$$

where "$d_0$" is said distance between the first and second receiving sections, "$\Delta t$" represents a propagation time difference between said first and second ultrasonic beams transmitted from said first and second transmitter sections and received by said first and second receiver sections, and "$\theta_0$" is defined by an angle of one of said first and second ultrasonic beams incident upon said ROI with respect to a receiving direction of one of said first and second receiving sections.

9. An apparatus as claimed in claim 7, wherein said calculator means calculates said propagation time from said synthesized echo signal based upon a method of measuring a center of gravity of said synthesized echo signal.

10. An apparatus as claimed in claim 7, wherein said calculator means calculates said propagation time from said synthesized echo signal based upon a method of measuring a peak value of said synthesized echo signal.

11. An apparatus as claimed in claim 7, wherein said first and second receiver sections are located inside said first and second transmitter sections along a longitudinal direction of the array of said transducer means.

12. An apparatus for measuring an ultrasonic velocity in a region of interest (ROI) within a medium by utilizing plural ultrasonic beams, comprising:

transducer means including a plurality of transducer elements arranged in an array, which are subdivided into at least first and second transmitter sections and first and second receiver sections, said sections being arranged in the order of transmitter-receiver-receiver-transmitter sections, and being located at predetermined distances, and each of said first and second transmitter and receiver sections being constructed of a plurality of transducer elements;

driver means for driving said first and second transmitter sections to transmit first and second ultrasonic beams respectively toward said ROI, said first ultrasonic beam being intersected by said second ultrasonic beam within said ROI;

detector means coupled to said first and second receiver sections for detecting ultrasonic echoes reflected from four points, which correspond to four corners of a rectangular region in said ROI to produce four detected echo signals;

means for temporarily storing said detected echo signals sequentially derived from said first and second receiver sections, and for adding said stored echo signals to produce a single synthesized echo signal;

calculator means for calculating from said synthesized echo signal, propagation times of said ultrasonic beams and an ultrasonic velocity within said ROI based upon said calculated propagation times and said distance between said first and second receiver sections.

13. An apparatus as claimed in claim 12, wherein said calculator means calculates the following equation to obtain said velocity within said ROI:

$$C_0 = \frac{2d_0}{\Delta t} \cot\left(\frac{\theta_0}{2}\right)$$

where "$d_0$" is said distance between the first and second receiving sections, "$\Delta t$" represents a propagation time difference between said first and second ultrasonic beams transmitted from said first and second transmitter sections and received by said first and second receiver sections, and "$\theta_0$" is defined by an angle of one of said first and second ultrasonic beams incident upon said ROI with respect to a receiving direction of one of said first and second receiving sections.

14. An apparatus as claimed in claim 12, wherein said calculator means calculates said propagation time from said synthesized echo signal based upon a method of measuring a center of gravity of said synthesized echo signal.

15. An apparatus as claimed in claim 12, wherein said calculator means calculates said propagation time from said synthesized echo signal based upon a method of measuring a peak value of said synthesized echo signal.

16. An apparatus as claimed in claim 12, wherein said first and second receiver sections are located inside said first and second transmitter sections along a longitudinal direction of the array of said transducer means.

17. An apparatus as claimed in claim 12, further comprising:

a logarithmic amplifier for logarithmic-amplifying said echo signals derived from said receiver means; and, a detector for detecting said logarithmic-amplified echo signals to produce an ultrasonic tomographic image signal of said medium.

18. A method for measuring an ultrasonic velocity in a region of interest (ROI) within a medium by exciting transducer means, said transducer means including a plurality of transducer elements arranged in an array form which are subdivided into at least first and second transmitter sections and first and second receiver sections, comprising the steps of:

exciting said first and second transmitter sections to transmit first and second ultrasonic beams toward said ROI, said first ultrasonic beam being intersected by said second ultrasonic beam within said ROI;

receiving ultrasonic echoes reflected from said ROI by operating said first and second receiving sections to produce echo signals; and processing said echo signals to obtain propagation times of said ultrasonic beams and an ultrasonic velocity within said ROI based upon said propagation times and a distance over which said first and second receiver sections are separated.

* * * * *